United States Patent [19]
Powning

[11] 3,895,744
[45] July 22, 1975

[54] CONVEYORS

[75] Inventor: Leslie George Powning, Stockport, England

[73] Assignee: Sturtevant Engineering Co., Limited, Finchley, England

[22] Filed: Jan. 18, 1974

[21] Appl. No.: 434,644

Related U.S. Application Data
[63] Continuation of Ser. No. 144,860, May 19, 1971, abandoned.

[52] U.S. Cl. .................................... 222/231; 9/463
[51] Int. Cl. ............................................ G01f 13/00
[58] Field of Search .......... 222/231, 232, 233, 234, 222/235, 413

[56] References Cited
UNITED STATES PATENTS

| 201,715 | 3/1878 | Swan | 222/231 X |
| 1,783,092 | 11/1930 | Lewis | 222/231 |
| 3,013,701 | 12/1961 | Joschko | 222/231 X |

Primary Examiner—Allen N. Knowles
Assistant Examiner—Larry H. Martin
Attorney, Agent, or Firm—Cushman, Darby & Cushman

[57] ABSTRACT

A conveyor having a screw and a toothed idler which intermeshes with the screw to form a barrier, across the helical recess of the screw, to material being advanced by the screw.

4 Claims, 3 Drawing Figures

PATENTED JUL 22 1975

3,895,744

CONVEYORS

This is a continuation of application Ser. No. 144,860, filed May 19, 1971, now abandoned.

This invention is concerned with improvements in and relating to conveyors and more particularly screw conveyors.

With certain materials which have to be metered on a continuous basis, a screw conveyor does not function. Such materials include pigments for use in plastics for injection moulding. These pigments may be in the sub-micron particle range and if offered to a screw conveyor they form with the screw, when it is rotated, a rotating cylinder and no axial advance of the pigment occurs.

In the case of materials to be fed from one zone at a first pressure to a second zone at a higher pressure, the helical core of material may be blown back along the screw.

According to this invention there is provided a screw conveyor in which a toothed idler, rotatable about an axis in a plane normal to the screw axis, engages the worm and is driven thereby, teeth of the wheel in operation consecutively forming a barrier, in the plane of the wheel containing the screw axis, across the helical recess of the screw where the screw is normal to the wheel.

In the case of pigment, the wheel inhibits the rotation of the pigment with the screw and in consequence the pigment is forced to move axially of the screw. In the case of a feed between two zones, the wheel forms a seal to interrupt the blow back path but does not interfere with axial movement of the material being fed.

Further features and advantages of the present invention will appear from the following description of some embodiments, given by way of example only, reference being had to the accompanying drawings, in which.

Figure 1:
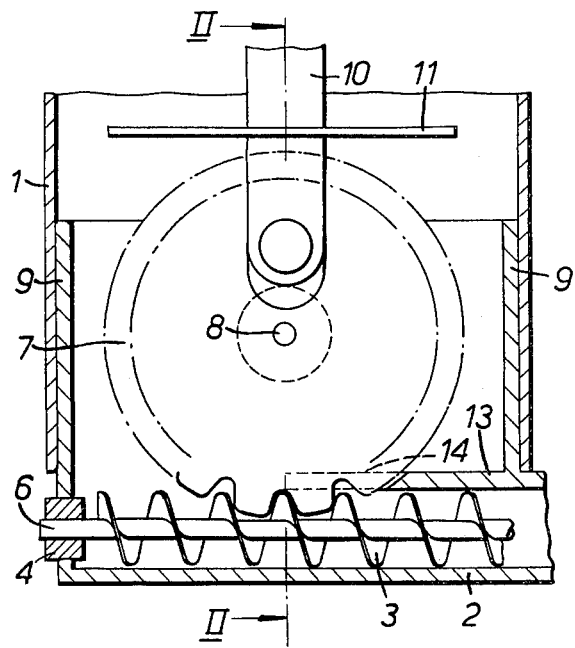
FIG. 1 is a cross-section through a hopper and an associated screw conveyor.
Figure 2:
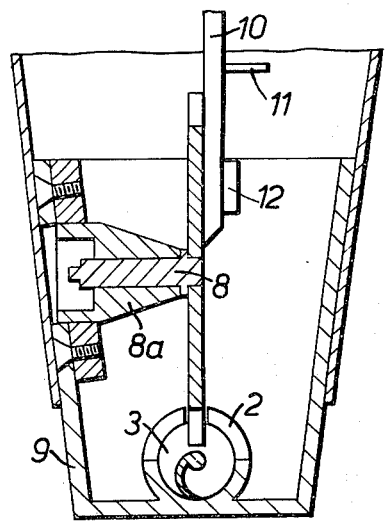
FIG. 2 is a section along the line II—II of FIG. 1.
Figure 3:
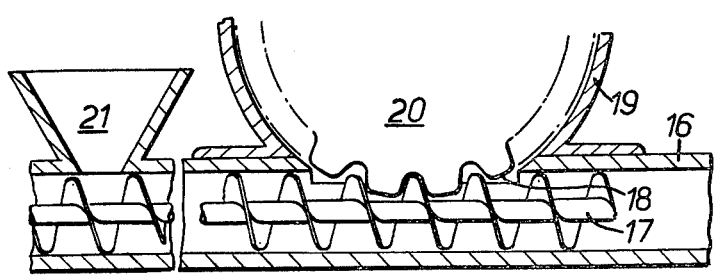
FIG. 3 is a section through a second embodiment of screw conveyor.

The hopper shown in FIGS. 1 to 3 comprises a wall 1 which at the lower end defines a container of reducing cross-section. A conduit 2 extends from the lower end of the container and receives a screw 3 set in suitable bearings such as 4. A drive connection 6 of any desirable form is provided for the screw, and for pigment work this is preferably a pulley drive so that by slacking off a tensioning jockey, the belt may be removed and the screw extracted for washing of the screw and of the conduit.

In bearings carried by the hopper wall is a toothed wheel 7 extending through inlet 22 carried on a spindle 8. The teeth of the wheel and the screw web are shaped so that they mesh together to form a barrier in the plane of the wheel and of the screw axis across the helical cavity of the screw in the path of pigment which might otherwise be entrained for rotational movement by the screw about the screw axis.

With a view to easy access to the wheel for cleaning, the wheel spindle 8 is set in bearing 8a supported by a carrier 9 which seats in the container and can be removed therefrom as a unit.

Pigment tends to 'bridge' very readily and with a view to maintaining movement of pigment toward the screw, agitating means are preferably provided such as air to fluidise the material or an agitator bar 10 having fingers 11 coupled to the wheel by a crank pin 12, the upper end of the bar being received in a slot in a lid (not shown) of the hopper.

To obtain a higher degree of sealing between the wheel and screw than if the wheel were simply situated clear of the hopper walls and in simple engagement with the screw, an arrangement which in fact functions, the conduit may be extended back inside the hopper as at 13 so that the wheel at least on the downstream side moves through a slot 14 in the tube. This arrangement will allow the screw to operate effectively against a pressure at the delivery end of the conduit above that in the hopper.

The above described screw conveyor is suitable for use in conjunction with a main conveyor operable to delivery up to 1000 lbs/hr. In the case of colour pigment the screw conveyor will operate satisfactorily to deliver 0.2 to 2% pigment for a powder/pigment mix or 1 to 6% colour concentrate for a powder/concentrate mix. The accuracy achieved is of the order of 5% of the pigment or concentrate rate required which ensures an end product of which the colour variation is not normally detectable by eye.

The embodiment above described in particularly suitable for feeding into a main screw conveyor itself feeding into a pneumatic conveyor as described in our co-pending application of even date. The main conveyor constitutes a standard screw conveyor for granular or powdered synthetic plastics into which the pigment conveyor opens near the main screw inlet end. The main screw will deliver to the pneumatic conveyor inlet.

To achieve feed from a first zone at a pressure higher to a second zone at a higher pressure, the wheel may be set in its own housing downstream of an inlet. Referring to FIG. 3 a conduit 16 houses a screw 17 and a slot 18 in the conduit communicates with a housing 19 closely surrounding and supporting a toothed wheel 20. The teeth of this wheel chop the helical recess defined by the screw and form a barrier to a back pressure tending to urge material in the recess upstream toward an inlet 21. The teeth do not interfere with the feed of the material which travels axially of the conduit but back pressure along the helical path extending about the screw is interrupted.

I claim:

1. A screw conveyor unit for use with a hopper having an outlet opening, said unit comprising:

a. a hollow carrier removably receivable by the hopper outlet opening and communicating with the hopper;

b. a conduit supported by said carrier, said conduit having at one end thereof an inlet disposed within said carrier for communicating with the interior of said carrier, said conduit having a wall and a slot formed in said wall within said carrier, said slot also providing communication between said carrier and said conduit, said slot extending in the direction of said conduit axis and being located downstream of said inlet in the conveying direction; and said conduit having an outlet at its other end for delivering material to be discharged from said hopper;

c. a worm conveyor screw having a spindle extending from said inlet to said outlet and having a helical screw flight defining with said conduit a helical passage from material to be conveyed;

d. drive means for said conveyor screw;
e. a generally planar toothed element rotatably mounted in said carrier by bearing means, said element being mounted with a portion thereof extending through said slot in said conduit with the teeth thereof meshing with said flight of said conveyor screw to form a barrier across said helical passage;
f. a reciprocable agitator supported on said carrier and extending from said element into said hopper; and
g. means coupling said element and said agitator so that rotation of said element will effect reciprocation of said agitator.

2. A conveyor unit as claimed in claim 1, wherein said agitator comprises a bar coupled to said element by a crank pin, and fingers extending from said bar.

3. A conveyor unit as claimed in claim 1, wherein said spindle of said conveyor screw is mounted at one end in said carrier by bearing means, said flight extends into said carrier from said inlet of said conduit, said slot opens into said inlet of said conduit, and said toothed element has a portion with the teeth thereof meshing with said portion of said flight extending into said carrier.

4. A conveyor unit as claimed in claim 1, wherein said carrier has an open top communicating with said hopper, is generally rectangular in horizontal section, and said section decreases from said open top to its lower end.

* * * * *

UNITED STATES PATENT OFFICE
CERTIFICATE OF CORRECTION

Patent No. 3,895,744   Dated July 22, 1975

Inventor(s) Leslie George Powning

It is certified that error appears in the above-identified patent and that said Letters Patent are hereby corrected as shown below:

In the heading of the patent add:

--[30]  Foreign Application Priority Data

May 22, 1970   Great Britain.....25010/70--

Signed and Sealed this twenty-third Day of December 1975

[SEAL]

Attest:

RUTH C. MASON
Attesting Officer

C. MARSHALL DANN
Commissioner of Patents and Trademarks